US010178255B2

(12) United States Patent
Nobutani et al.

(10) Patent No.: US 10,178,255 B2
(45) Date of Patent: Jan. 8, 2019

(54) IMAGE PROCESSING SYSTEM, METHOD, AND NON-TRANSITORY COMPUTER READABLE MEDIUM (71) Applicant: FUJI XEROX CO., LTD., Tokyo (JP)

(72) Inventors: Naoya Nobutani, Yokohama (JP); Masafumi Ono, Yokohama (JP); Manabu Hayashi, Yokohama (JP); Kunitoshi Yamamoto, Yokohama (JP); Toru Suzuki, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/202,273

(22) Filed: Jul. 5, 2016

(65) Prior Publication Data
US 2017/0264765 A1 Sep. 14, 2017

(30) Foreign Application Priority Data

Mar. 14, 2016 (JP) ................. 2016-050270

(51) Int. Cl.
H04N 1/00 (2006.01)
G06K 15/00 (2006.01)
G06F 3/12 (2006.01)
H04N 1/44 (2006.01)
G06F 21/32 (2013.01)
G06K 9/00 (2006.01)
H04L 29/06 (2006.01)
G06F 21/60 (2013.01)

(52) U.S. Cl.
CPC ....... H04N 1/00854 (2013.01); G06F 3/1204 (2013.01); G06F 3/1222 (2013.01);
(Continued)

(58) Field of Classification Search
CPC ....... H04N 1/00854; H04N 2201/0094; H04N 1/00408; H04N 1/00875; G06K 15/005; G06K 15/4095
See application file for complete search history.

(56) References Cited

U.S. PATENT DOCUMENTS 9,065,955 B2 6/2015 Baba
2005/0200885 A1 9/2005 Nishizawa et al.
(Continued)

FOREIGN PATENT DOCUMENTS

CN 1662031 A 8/2005
CN 102737173 A 10/2012
(Continued)

OTHER PUBLICATIONS

Jul. 5, 2017 Search Report issued in European Patent Application No. 16182325.7.
(Continued)

Primary Examiner — Iriana Cruz
(74) Attorney, Agent, or Firm — Oliff PLC (57) ABSTRACT An image processing system includes a reception unit that receives an image forming instruction from a user, a retaining unit that retains the image forming instruction in association with the user, an acceptance unit that accepts an execution instruction from the user, an authentication unit that performs authentication of the user, and an image forming unit that executes the image forming instruction retained by the retaining unit in association with the authenticated user without accepting the execution instruction by the acceptance unit in a case where the authentication unit completes the authentication.

13 Claims, 8 Drawing Sheets (52) U.S. Cl.
CPC .......... *G06F 3/1238* (2013.01); *G06F 3/1267* (2013.01); *G06F 3/1292* (2013.01); *G06F 21/32* (2013.01); *G06K 9/00221* (2013.01); *G06K 15/005* (2013.01); *G06K 15/4095* (2013.01); *H04L 63/0861* (2013.01); *H04N 1/00381* (2013.01); *H04N 1/00395* (2013.01); *H04N 1/00403* (2013.01); *H04N 1/00408* (2013.01); *H04N 1/00411* (2013.01); *H04N 1/00488* (2013.01); *H04N 1/00875* (2013.01); *H04N 1/442* (2013.01); *H04N 1/444* (2013.01); *H04N 1/4413* (2013.01); *H04N 1/4433* (2013.01); *G06F 21/608* (2013.01); *H04N 2201/0094* (2013.01); *H04N 2201/0098* (2013.01)

(56) References Cited

U.S. PATENT DOCUMENTS

| | | | |
|---|---|---|---|
| 2010/0067051 A1 | 3/2010 | Seki | |
| 2011/0286028 A1 | 11/2011 | Kinouchi et al. | |
| 2012/0250067 A1* | 10/2012 | Liu | G06F 21/34 358/1.14 |
| 2013/0016388 A1* | 1/2013 | Amano | G06F 3/1204 358/1.14 |
| 2014/0104636 A1* | 4/2014 | Baba | H04N 1/00323 358/1.14 |
| 2015/0055168 A1 | 2/2015 | Kato | |
| 2015/0103365 A1 | 4/2015 | Baba | |
| 2015/0134938 A1 | 5/2015 | Hosono et al. | |
| 2015/0264209 A1 | 9/2015 | Shiraishi | |
| 2015/0317109 A1 | 11/2015 | Kirihata | |
| 2016/0371040 A1* | 12/2016 | Idehara | G06F 3/1238 |
| 2017/0017446 A1* | 1/2017 | Dohi | G06F 3/1238 |

FOREIGN PATENT DOCUMENTS

| | | |
|---|---|---|
| JP | 2009-234106 A | 10/2009 |
| JP | 5482956 B1 | 5/2014 |
| JP | 2016018264 A | 2/2016 |

OTHER PUBLICATIONS

Sep. 19, 2018 Office Action issued in Chinese Patent Application No. 201610670977.3.

* cited by examiner

IMAGE PROCESSING SYSTEM, METHOD, AND NON-TRANSITORY COMPUTER READABLE MEDIUM

CROSS-REFERENCE TO RELATED APPLICATIONS

This application is based on and claims priority under USC 119 from Japanese Patent Application No. 2016-050270, filed on Mar. 14, 2016.

BACKGROUND

Technical Field

The present invention relates to an image processing system, an image processing method, and a non-transitory computer readable medium.

SUMMARY

According to an aspect of the invention, there is provided an image processing system including: a reception unit that receives an image forming instruction from a user; a retaining unit that retains the image forming instruction in association with the user; an acceptance unit that accepts an execution instruction from the user; an authentication unit that performs authentication of the user; and an image forming unit that executes the image forming instruction retained by the retaining unit in association with the authenticated user without accepting the execution instruction by the acceptance unit in a case where the authentication unit completes the authentication.

BRIEF DESCRIPTION OF DRAWINGS

Exemplary embodiments of the present invention will be described in detail based on the following figures, wherein.

DETAILED DESCRIPTION

An exemplary embodiment of the invention will be described with reference to the accompanying drawings.

First, a basic principle of the exemplary embodiment will be described.

As described above, a configuration where instructions to form an image such as print instructions are temporarily retained (held) in an image processing system and the instructions to form the image are executed with instructions of a user at the image processing system as a trigger is effective from the viewpoint of improving security. Such systems can prevent the printed material from being seen by a person other than the user or being taken away, which may happen in a case where the systems execute the print instructions on receiving them. However, further operations such as operations on a UI touch panel in the image processing system are needed to be performed by the user. When a user operates an image processing system, authentication of the user is generally required. Eventually, a user that performs an image formation goes through the following operations: (A) instructing to form an image in the image processing system→authenticated in the image processing system→instructing for execution on the UI touch panel of the image processing system.

Accordingly, in the exemplary embodiment, by focusing on authentication in an image processing system and automatically performing an image forming process using completion of the authentication as a trigger, instructions for execution on an UI touch panel are not necessary, and thus the operations by a user is designed to be reduced.

In the exemplary embodiment, a user can perform an image formation through the following operations: (B) instructing to form an image in the image processing system→authenticated in the image processing system.

Various authentication methods such as authentication using an IC card, biometric authentication of a facial image, a fingerprint, a vein, or the like, authentication using a mobile terminal, authentication by inputting a password can be adopted as the authentication in the exemplary embodiment. Here, authentication other than authentication using an UI touch panel is preferable. The authentication can be classified generally into authentication in the vicinity of an image processing system (vicinity authentication) and authentication at a position relatively away from an image processing system (remote authentication).

The vicinity authentication is, for example, authentication performed by passing an IC card over, authentication performed by a fingerprint or a vein, or authentication performed by capturing a face with a camera with the face approaching the predetermined position. The vicinity authentication is authentication in which the intention of the user is reflected. That is, a user that wants to form an image can be assumed to actively pass an IC card over or actively pressing his or her finger or the like against a reading unit to perform authentication.

On the other hand, the remote authentication is, for example, authentication performed by image-capturing with a camera at a remote distance, and it is difficult to say that the intention of the user is always reflected. That is, a person other than the user, the user that has an intention of forming an image, may be present incidentally within a visual field of the camera and the person may be erroneously authenticated in some cases. In a case where a charging process is accompanied with an image forming process such as printing and performed, an erroneous charging process may be performed through an automatic image forming processes in response to completion of authentication. The authentication performed with a camera can be included in either the vicinity authentication or the remote authentication.

The authentication can also be classified into active authentication and passive authentication, generally. The active authentication is, for example, authentication performed by passing an IC card over or authentication performed by a fingerprint or a vein. The active authentication is authentication in which the intention of the user is reflected. The passive authentication is, for example, authentication performed by capturing the user from a remote distance with a camera. In the passive authentication, an erroneous charging process may be performed through an automatic image forming processes in response to completion of authentication, as in the case of the remote authentication. In other words, the active authentication can also be said to be authentication starting using a user's action as a source and the passive authentication can also be said to be authentication starting not using a user's action as a source.

Accordingly, in the exemplary embodiment, when the remote authentication or the passive authentication is performed, image forming is not automatically performed by completion of authentication, but a step of confirming an intention of an authenticated user is intervened. When the authenticated user expresses an explicit intention, the image forming is performed, thereby preventing an erroneous charging process. In this case, a user performs an image formation through the following operations: (C) instructing to form an image in the image processing system→authenticated in the image processing system→indicating an intention to perform the image formation. Preferably, the indicating of the intention to perform the image forming is performed remotely as in the remote authentication, which is different from instructions for execution on a UI touch panel. Examples of the remote indication of the intention include an indication of the intention by a mobile terminal using wireless communication, by making a gesture to a gesture sensor such as a camera, and by a voice to a microphone. When the operations of (A) and the operations of (C) are compared, the number of steps is the same. In the operation steps of (C), however, instructions for execution on an UI touch panel are commonly not necessary as in the operation steps of (B). In particular, in an indication of the intention by a gesture or by a voice, a user can perform the corresponding gesture or utterance while approaching the image processing system. Therefore, the image forming process can be started before the user arrives at the vicinity of the image processing system.

Hereinafter, with respect to an exemplary embodiment, a case of printing document data or the like as image formation will be described specifically.

Figure 1:
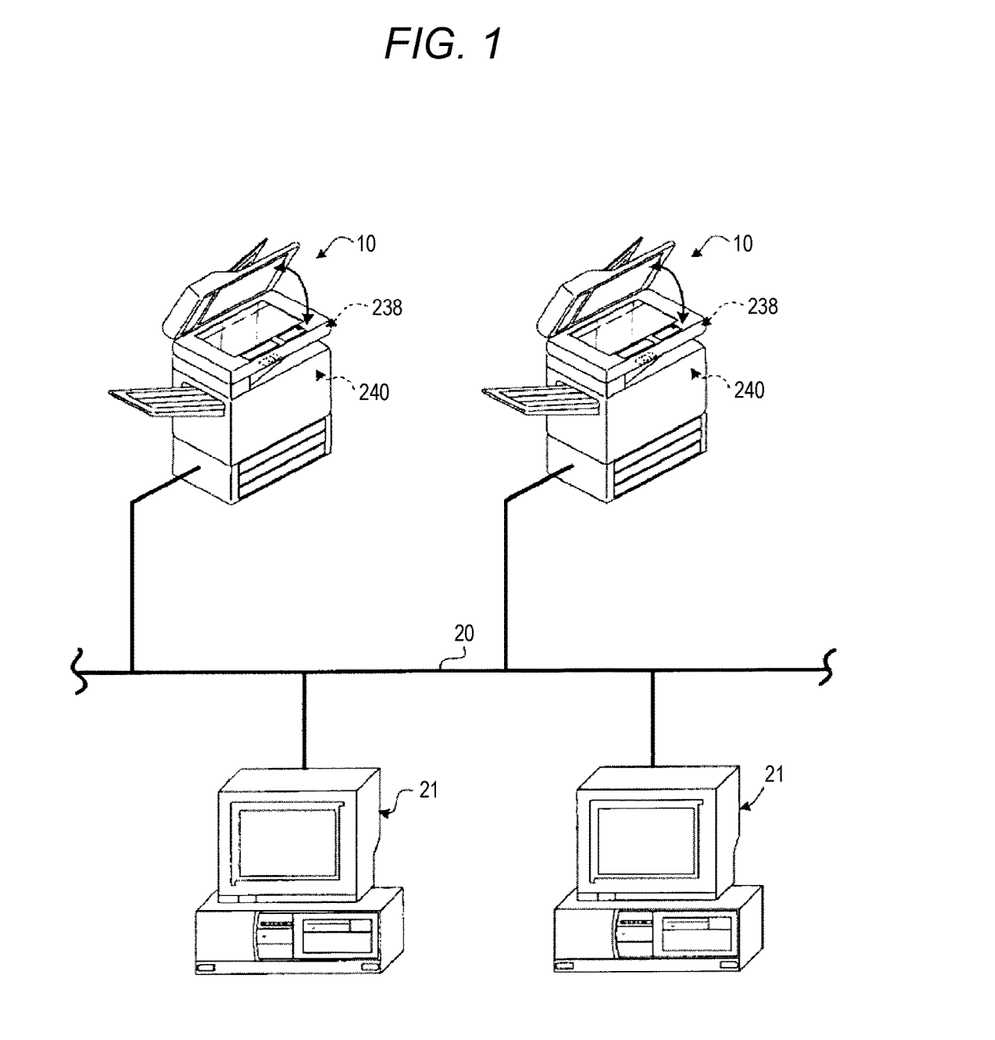
FIG. 1 is a system configuration diagram according to an exemplary embodiment.

FIG. 1 is a system configuration diagram according to an exemplary embodiment.

An image processing system 10 is connected to a network 20 such as an internet. The number of the image processing systems 10 is arbitrary. A personal computer (PC) 21 serving as a terminal is also connected to the network 20. A user remotely outputs image forming (printing) instructions to the image processing system 10 from the PC 21. Apart from this, the user can also output print instructions by various operations in front of the image processing system 10. The feature of the exemplary embodiment is a process in a case where the user outputs the print instructions from the PC 21 via the network 20, so that the description will focus on such process.

The PC 21 is merely an example of the terminal, and may be a smart phone or a tablet terminal. The network 20 may either be in a wired or wireless manner.

The image processing system 10 includes an image forming unit 240 that forms an image on a recording sheet and an image reading unit 238 that reads out a document image. The image processing system may further include a facsimile communication control circuit. The image processing system 10 includes a main controller 200 to control the image forming unit 240, the image reading unit 238, and the facsimile communication control circuit, thereby temporarily storing image data of the document image that is read out by the image reading unit 238 and transmitting the read-out image data to the image forming unit 240 or the facsimile communication control circuit.

The main controller 200 is connected to the network 20 such as the Internet, and the facsimile communication control circuit is connected to a telephone network. The main controller 200 is connected to, for instance, the PC 21 via the network 20, and serves as a unit that receives image data and performs facsimile reception/transmission using the facsimile communication control circuit via the telephone network.

The image reading unit 238 includes a document platen for positioning a document, a scanning drive system that irradiates the document with light so as to scan the image of the document placed on the document platen, and a photoelectric conversion element such as a charge coupled device (CCD) that receives light reflected or transmitted by scanning of the scanning drive system and then converts the received light into an electric signal.

The image forming unit 240 includes a photoconductor. A charging unit, a scanning exposure unit, an image developing unit, a transfer unit, and a cleaning unit are disposed around the photoconductor. The charging unit uniformly charges the photoconductor, the scanning exposure unit performs scanning with light beams based on image data, the image developing unit develops an electrostatic latent image formed through scanning and exposure performed by the scanning exposure unit, the transfer unit transfers the developed image on the photoconductor onto the recording sheet, and the cleaning unit cleans the surface of the photoconductor after the transfer has been finished. A fixing unit is disposed on a transport path of the recording sheet to fix the image that has been transferred to the recording sheet.

Figure 2:
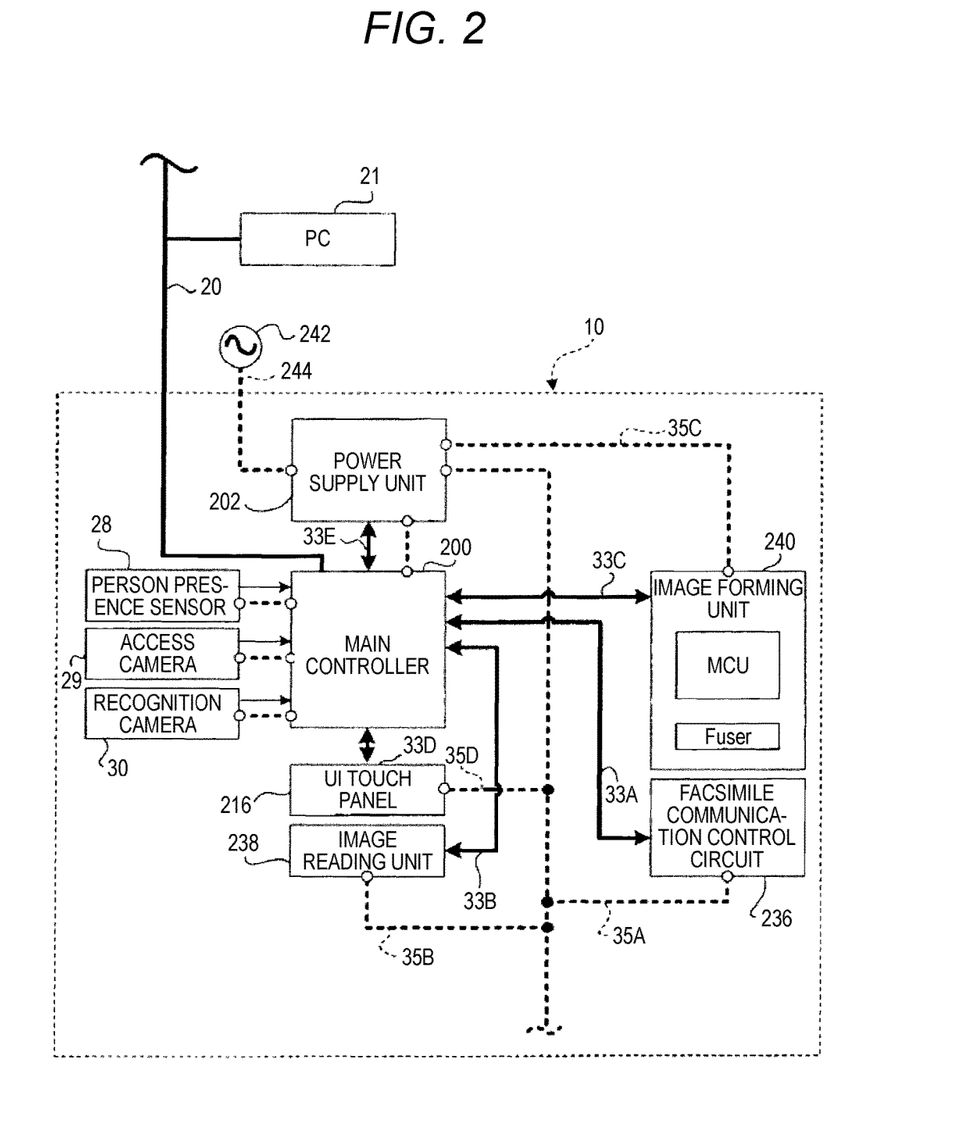
FIG. 2 is a block diagram illustrating a configuration of an image processing system according to the exemplary embodiment.

FIG. 2 is a block diagram illustrating a configuration of the image processing system 10.

The network 20 is connected to the main controller 200. The main controller 200 is connected to the facsimile communication control circuit 236, the image reading unit 238, the image forming unit 240, and an UI touch panel 216 via buses 33A to 33D, such as a data bus or a control bus, respectively. The main controller 200 mainly controls each of the processing units in the image processing system 10.

The image processing system 10 is provided with a power supply unit 202 that is connected to the main controller 200 through a harness 33E. The power supply unit 202 is supplied with power from the commercial power supply 242. The power supply unit 202 is provided with power supply lines 35A to 35D that supply power to the main controller 200, the facsimile communication control circuit 236, the image reading unit 238, the image forming unit 240, and the UI touch panel 216 independently from each other. Thus, the main controller 200 individually performs the supply of power to each of the processing units (devices) or individually interrupts the supply of power.

Plural sensors (a person presence sensor 28, an access camera 29, and a recognition camera 30) are connected to the main controller 200 and monitor whether there is a person in the surrounding area of the image processing system 10.

The person presence sensor 28 detects movement of a moving body such as a user in the surrounding area of the image processing system 10. An instance of the person presence sensor 28 may include an infrared sensor using a pyroelectric effect of a pyroelectric element. The feature of the sensor using the pyroelectric effect of the pyroelectric element is that power consumption is lower and that a detection area is broad, compared to a reflective sensor provided with a light projecting unit and a light receiving unit. Since the person presence sensor 28 detects movement of a moving body, it does not detect presence of a person when the person stays even though the person is in the detection area. When the person presence sensor 28 detects the movement of the moving body, each of the units of the image processing system 10 is supplied with power and is transferred to an operation state from a sleep state.

The access camera 29 detects movement information (including distance information and movement direction information) of the moving body such as a user. The access camera 29 captures images with which at least a transition of a position coordinate of the moving body may be recognized. When the position of the moving body is acquired, if the moving body transmits a signal, radar may also be applicable. For instance, an image sensor (a CCD image sensor or a CMOS image sensor) may be applicable as the access camera 29. As a specification of the access camera 29, it is desirable that the resolution of the access camera 29 be at a level at which the trace of the moving body that is approaching the image processing system 10 is proven and the field of view (image capturing area) of the access camera 29 needs to be broader (or especially has a wider angle) than that of the person presence sensor 28.

The recognition camera 30 detects individual recognition information of a user. In order to detect the individual recognition information of the user, for instance, the recognition camera 30 captures inherent feature information such as a face of the user. The main controller 200 executes authentication by collation and analysis between image information of the characteristics of the face or the like captured by the recognition camera and an image database regarding the characteristics of faces that have been registered in advance. The individual recognition information is used to control the operation of the image processing system 10. An image sensor (a CCD image sensor or a CMOS image sensor) may be applicable as the recognition camera 30. The face recognition is performed using a filter configuration suitable for face recognition (mainly, a filter configuration with which the contour of the face, eyes, a nose, a mouth, and the like are clearly detected).

The person presence sensor 28 and the access camera 29 are not necessarily configured as a separate member and may serve as a sensor that performs both person presence detection and access detection. For instance, these sensors may be configured by a two-dimensional infrared array sensor to detect a temperature distribution of area by acquiring a two-dimensional infrared image, detect a human body, and detect movement of the human body in real time.

A target to be captured by the recognition camera 30 is not limited to the face, and a collation may be performed by capturing of a bar code or a QR Code (registered trademark) of an item (an ID card or documents) that the user has or carries. The person presence sensor 28 and the access camera 29 may be attached to a pillar unit on a housing of the image processing system 10, the pillar unit having a longitudinally elongated rectangular shape. The recognition camera 30 may be attached in the vicinity of the UI touch panel. The recognition camera 30 may be attached to a rear wall or a pole of the image processing system 10 to have a configuration where the user is captured from the front or a configuration where the camera is used to authenticate a user around the image processing system and may be used together with a scanner, which captures and incorporates an image, by directing the camera to a downward side. As the access camera 29 and the recognition camera 30, an integrated two-way camera may be used.

Further, the recognition camera 30 does not necessarily provided in the image processing system 10, and may be a monitoring camera that monitors an area in the vicinity of the image processing system 10 or a network camera that is connected to the network. Alternatively, the recognition camera 30 may be a camera for a mobile terminal carried by a user. The exemplary embodiment of the invention may have a configuration where a face image obtained by the monitoring camera, the network camera, or the user's mobile terminal is received by a network server, and the network server performs authentication and supplies authentication results to the image processing system 10. In summary, as will be described below, the exemplary embodiment of the invention may have a configuration where the image processing system determines, according to the authentication results regarding the user acquired, whether a print job related to the authenticated user is present, and, when the print job is present, executes the print job without receiving instructions for execution from the user. Moreover, the authentication results may be acquired by authentication determination in the own device or acquired from another device.

In addition to this configuration, the image processing system 10 may include a speaker that produces a sound of a notification voice or a microphone through which a voice is input from the user, and an interface that establishes communication with the mobile terminal (a smart phone or the like) carried by the user.

Figure 3:
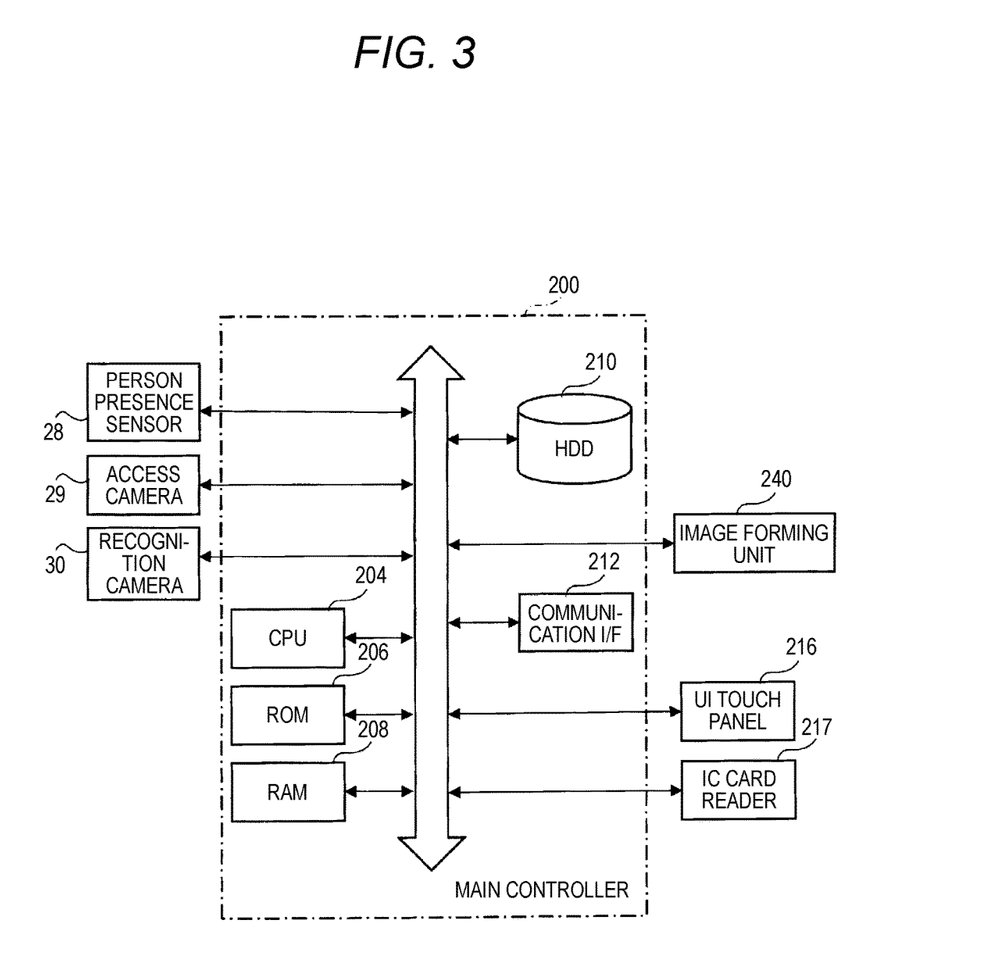
FIG. 3 is a block diagram illustrating a configuration of a main controller according to the exemplary embodiment.

FIG. 3 is a block diagram illustrating a configuration of the main controller 200. The main controller 200 includes a CPU 204, a ROM 206, a RAM 208, an HDD (Hard Disk Drive) 210, a communication interface (I/F) 212, and a bus. The image forming unit 240, the UI touch panel 216, and an IC card reader 217 are connected to the bus. Based on a processing program recorded in the ROM 206 or the hard disk 210, the CPU 204 operates to realize the function of the main controller 200. The program is installed from a recording medium (for instance, a CD, a DVD, a BD (Blu-ray Disk), an USB memory, or an SD memory) with the program stored therein, and the CPU 204 may operate based on the installed program to realize the function. The facsimile communication control circuit 236 or the image reading unit 238 are also connected to the bus (see FIG. 2), but the description thereof will not be presented for convenience.

When the user outputs print instructions including document data to the image processing system 10 from the PC 21 at own seat, the main controller 200 receives the print instructions, and once retains (stores) the print instructions in the HDD 210 or the RAM 208 in association with the user instead of immediately executing the print instructions. Thereafter, when the user approaches the image processing system 10 and is authenticated by the recognition camera 30, the retained print instructions of the user are executed by reading them with the completion of authentication as a trigger. At this time, the operation of the UI touch panel 216 is not required, and the main controller 200 prints only with the completion of authentication as a condition to start the printing. Accordingly, the user can output the print instructions from the PC 21 and print a desired document after only the completion of authentication with the image processing system 10, and the operation with the UI touch panel 216 of the image processing system 10 is not required.

Figure 4:
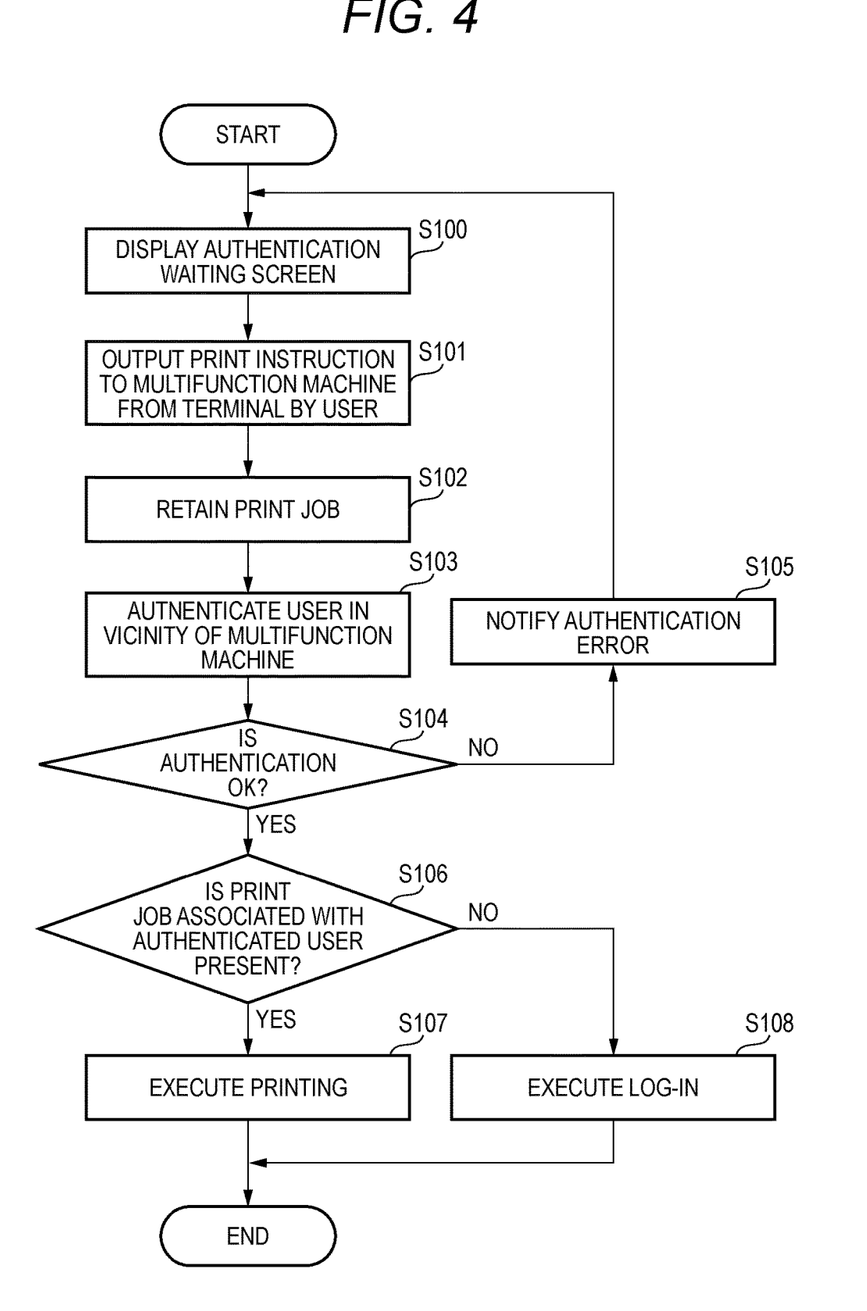
FIG. 4 is a flowchart illustrating a process according to the exemplary embodiment.

FIG. 4 is a flowchart illustrating a process according to the exemplary embodiment. A multifunction machine implemented with a plurality of functions such as printing and scanning is exemplified as the image processing system 10.

In a case where the user does not yet output the print instructions to the image processing system 10, the multifunction machine is in a sleep state when the moving body is not detected by the person presence sensor 28. Power is supplied to the UI touch panel 216 and an authentication waiting screen is displayed on the UI touch panel 216 (S100) when the moving body is detected by the person presence sensor 28. For instance, a message such as "please move your face close to the screen and conform the size of the face to a guide" may be displayed on the authentication waiting screen.

Subsequently, when the user operates the PC 21 at own seat and outputs the print instructions to the multifunction machine (S101), the main controller 200 of the multifunction machine receives the print instructions and stores the print job in the HDD 210 or the RAM 208 in association with the user to hold (retain) the print job (S102). Therefore, the print job will not be directly executed at a point of time when the print job is received. For instance, when a user A outputs print instructions of document data "a" at a point of time Ta, the print job A: user A—document data "a"—point of time Ta are stored in association with each other. When print instructions are received from a plurality of users, the main controller 200 classifies and retains these print instructions for each user. For instance, the main controller 200 classifies and retains the print instructions as follows:

print job A: user A—document data "a"—point of time Ta
print job B: user B—document data "b"—point of time Tb
print job C: user C—document data "c"—point of time Tc
print job D: user D—document data "d"—point of time Td.

Next, face authentication of the user with the recognition camera 30 is executed in a state where the user stands in the vicinity of the multifunction machine (for instance, in front of the multifunction machine) (S103), and it is determined whether the authentication is OK or NG (S104).

When the authentication is NG, that is, when a face image itself obtained by the recognition camera 30 is too inappropriate to be authenticated or no matching face image is present even in a case where the face image obtained by the recognition camera 30 collates with face images registered in advance, the main controller 200 displays a predetermined authentication error on the UI touch panel 216 and notifies it to the user (S105).

When the authentication is OK, that is, when the face image obtained by the recognition camera 30 matches any one of face images registered in advance, it is determined whether there is a print job associated with the user that is authenticated (S106).

When the print job associated with the authenticated user is present in the print jobs that have been retained, the main controller 200 outputs a control command to the image forming unit 240 and executes the print job (S107). For instance, when the authenticated user is the user A, the print job A associated with the user A is executed and the document data "a" is printed out.

On the other hand, when the print job associated with the authenticated user is not present in the print jobs that have been retained, the user is simply deemed not to output print instructions from the PC 21 at own seat in advance but to be authenticated to operate the multifunction machine, and a normal log-in is executed (S108). That is, various operations using the UI touch panel 216 are permitted, and various processes (reading out the image, facsimile transmission, or the like) according to the operation by the UI touch panel 216 are executed.

In this exemplary embodiment, it is to be noted that the print job is automatically executed without additional operations when the authentication is completed in the process of S104 and the print job associated with the authenticated user is present in the process of S106. Since the authentication is executed when the user is positioned in the vicinity of the multifunction machine, it is possible to prevent a printed material being seen or taken away by a person other than the user.

In this exemplary embodiment, the authentication is performed using the face image obtained by the recognition camera 30, but the authentication may performed using an IC card carried by the user. When card information of the user read out by the IC card reader 217 matches the information registered in advance, the main controller 200 determines that the authentication is OK and executes the print job associated with the authenticated user. Even in this case, after the print instructions are output by the PC 21, the print instructions are executed only by completion of authentication of the user in the multifunction machine.

In addition, the authentication may be performed using a mobile terminal (smart phone or the like) carried by the user instead of the authentication using the IC card. The user transmits or receives data to and from the main controller 200 by passing the mobile terminal to a predetermined reading unit or via a near field communication, and user's authentication may be performed.

The authentication using the IC card or the authentication using the mobile terminal is accompanied by action reflecting a clear user's intention, for instance, by the passing operation of the IC card or the mobile terminal. In this sense, it can be said to be authentication due to the action reflecting the user's intention. The authentication by the capturing with the camera may be passive authentication, and the authentication by the IC card or the mobile terminal may be active authentication. In the passive authentication, a user that does not want to execute printing may be authenticated, whereas the active authentication has an advantage that a user that wants to execute printing can be authenticated.

In this exemplary embodiment, there may be problems when an charging process is executed in conjunction with the execution of the print job, for instance, when the authenticate user does not want to execute the printing. For instance, there may be a case where the user outputs the print instructions to the multifunction machine from the PC 21, but wants to stop the print for some reasons. In a case where authentication can be performed even at a position apart from the multifunction machine, a user who does not necessarily desire to print can also be erroneously authenticated. In this case, it is not desirable to automatically execute the print job on completion of the authentication.

In such a case, it is desirable to execute the print job by confirming a user's print intention while ensuring security and reducing the number of operation steps by the user (dispensing with operating the execution instructions at the UI touch panel 216).

Figure 5:
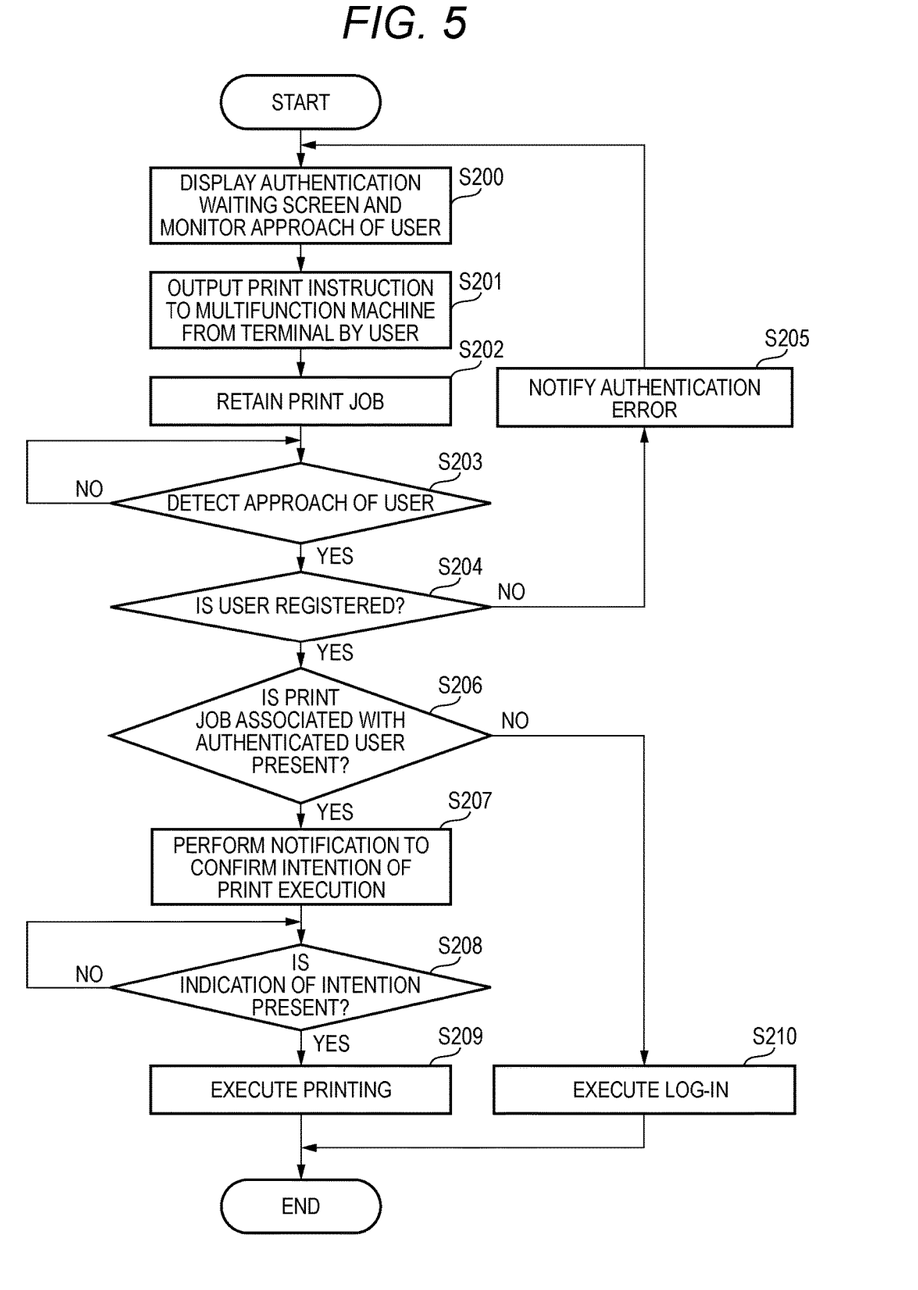
FIG. 5 is a flowchart illustrating another process according to the exemplary embodiment.

FIG. 5 is a flowchart illustrating a process according to this case. First, the main controller 200 displays an authentication waiting screen on the UI touch panel 216, and monitors an approach of an moving body such as a user using the access camera 29 (S200).

Subsequently, when the user operates the PC 21 at own seat and outputs a print instructions to the multifunction machine (S201), the main controller 200 receives the print instructions and stores the print job in the HDD 210 or the RAM 208 in association with the user to retain the print job (S202). Therefore, the print job will not be immediately executed at a point of time when the print job is received.

Next, it is determined whether the access camera 29 detects the approach of the user (S203). Alternatively, the approach of the user may be determined based on the presence or absence of establishment of a near field communication (Bluetooth or the like) with a mobile terminal (smart phone or the like) of the user, for instance. When the approach of the user is detected, it is determined whether the approaching user is a user registered in advance (S204). This determination is equivalent to the authentication of S104 in FIG. 4, and may be performed in a manner that a user's face image is captured by the recognition camera 30 and the captured face image collates with face images registered in advance or may be performed in another manner.

When the approaching user does not match the registered user, authentication is regarded as NG, and an authentication error is displayed on the UI touch panel 216 (S205).

When the approaching user matches the registered user, authentication is regarded as OK, and it is determined whether there is a print job associated with the user that is authenticated (S206).

When the print job associated with the authenticated user is present in the print jobs retained, the main controller 200 further performs a notification to confirm the intention of a print execution (S207). The intent of this notification is to notify the authenticated user of the fact that the printing is not executed when an indication of intention is not explicit. Examples of the notification include cases of: (1) displaying a message "print execution Y/N" on the mobile terminal (smart phone or the like) of the authenticated user and waiting for an instructions of "Y" from the user; (2) displaying a request message for passing the IC card of the user when face authentication is executed as the authentication and waiting for an insertion of the IC card into the IC card reader or acquisition of an IC card image with the recognition camera 30; and (3) requesting execution of specific action of the authenticated user (including movement of a body including hands or voice) and waiting for detection of the specific action with the recognition camera 30 or a voice input from a microphone.

A form of notification may be varied according to the form of authentication in S204. Specifically, for instance, a message such as "please perform the predetermined gesture if you permit executing the printing" is notified to the user by a voice when the authentication is performed using the face image obtained by the recognition camera 30, or the user is notified by displaying the message "print execution Y/N" on the mobile terminal of the user when the authentication is performed by the establishment of communication with the mobile terminal. When there is no print job associated with the user that is authenticated, a normal log-in is executed (S210).

After performing the notification to confirm the intention of the print execution, it is determined whether the indication of intention is present (S208). The retained print job is executed (S209) when the indication of intention is present, and the print job is not executed when the indication of intention is not present.

In this exemplary embodiment, the print job is executed only in a case where an explicit indication of intention of the authenticated user is present, and thus it is possible to prevent the print job and a charging process from erroneously being executed with respect to the user that does not have intention of printing.

Figure 6:
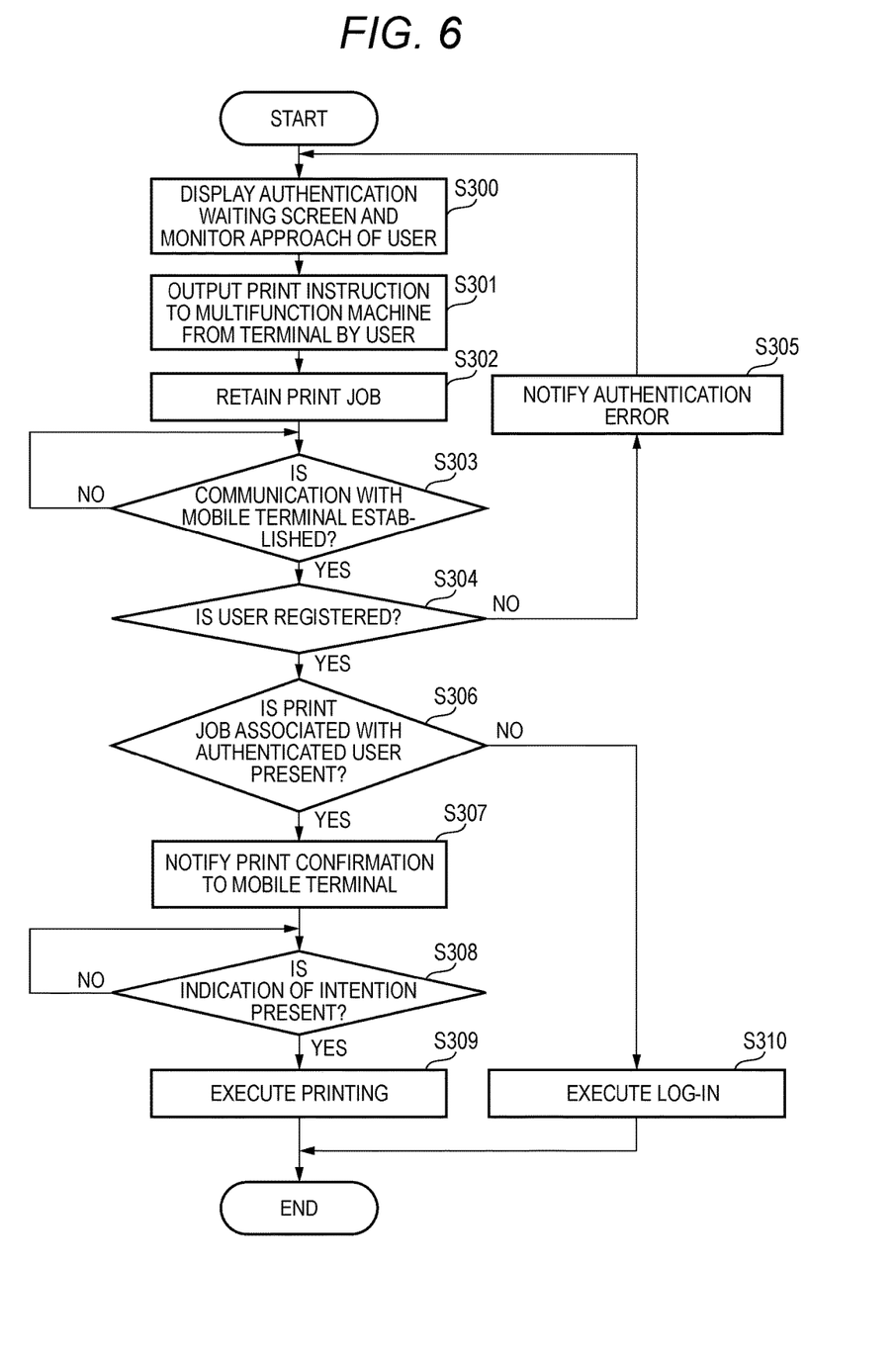
FIG. 6 is a flowchart illustrating another process according to the exemplary embodiment.

FIG. 6 is a modified instance of the process illustrated in FIG. 5 and a flowchart illustrating a process in the case of detecting the approach of the user using the mobile terminal (smart phone or the like) of the user and performing the notification of the indication of the intention.

First, the main controller 200 displays an authentication waiting screen on the UI touch panel 216, and monitors an approach of a user (S300). Specifically, the main controller 200 monitors whether the near field communication (Bluetooth or the like) with the mobile terminal of the user is established.

Subsequently, the user outputs the print instructions to the multifunction machine from the PC 21 at own seat (S301), and the main controller 200 retains the print job in association with the user (S302).

Subsequently, the main controller 200 determines whether the near field communication with the mobile terminal of the user is established (S303), and also determines whether the user is a user registered in advance when the communication is established (S304).

When the user of the mobile terminal, with which the communication is established, does not match the user registered in advance, authentication is regarded as NG, and thus an authentication error is displayed on the UI touch panel 216 (S305).

When the user of the mobile terminal, with which the communication is established, matches the user registered in advance, authentication is regarded as OK, and thus it is determined whether there is a print job associated with the authenticated user (S306). When there is no print job associated with the user that is authenticated, a normal log-in is executed (S310).

When there is the print job associated with the user that is authenticated, the main controller 200 notifies indication of intention of the print execution to the mobile terminal with which the communication that is established through the communication I/F 212 (S308). Specifically, examples of such notification include "print execution Y/N" and "start to print from now. If you don't mind, please operate the OK button".

When the user transmits "Y" or "OK" from the mobile terminal in response to such notification, the main controller 200 receives this transmission content through the communication I/F 212, determines that the indication of the intention of the print execution is present, and executes the printing (S309). On the other hand, when the user transmits "N" from the mobile terminal or does not transmit "OK", the main controller 200 determines that the indication of the intention of the print execution is not present and does not execute the printing. When the intention of the print execution is not present for a certain period of time, it may be shifted to normal log-in execution (S310), and a message such as "print execution has been canceled." may be notified by a voice or may be displayed on the UI touch panel 216.

Figure 7:
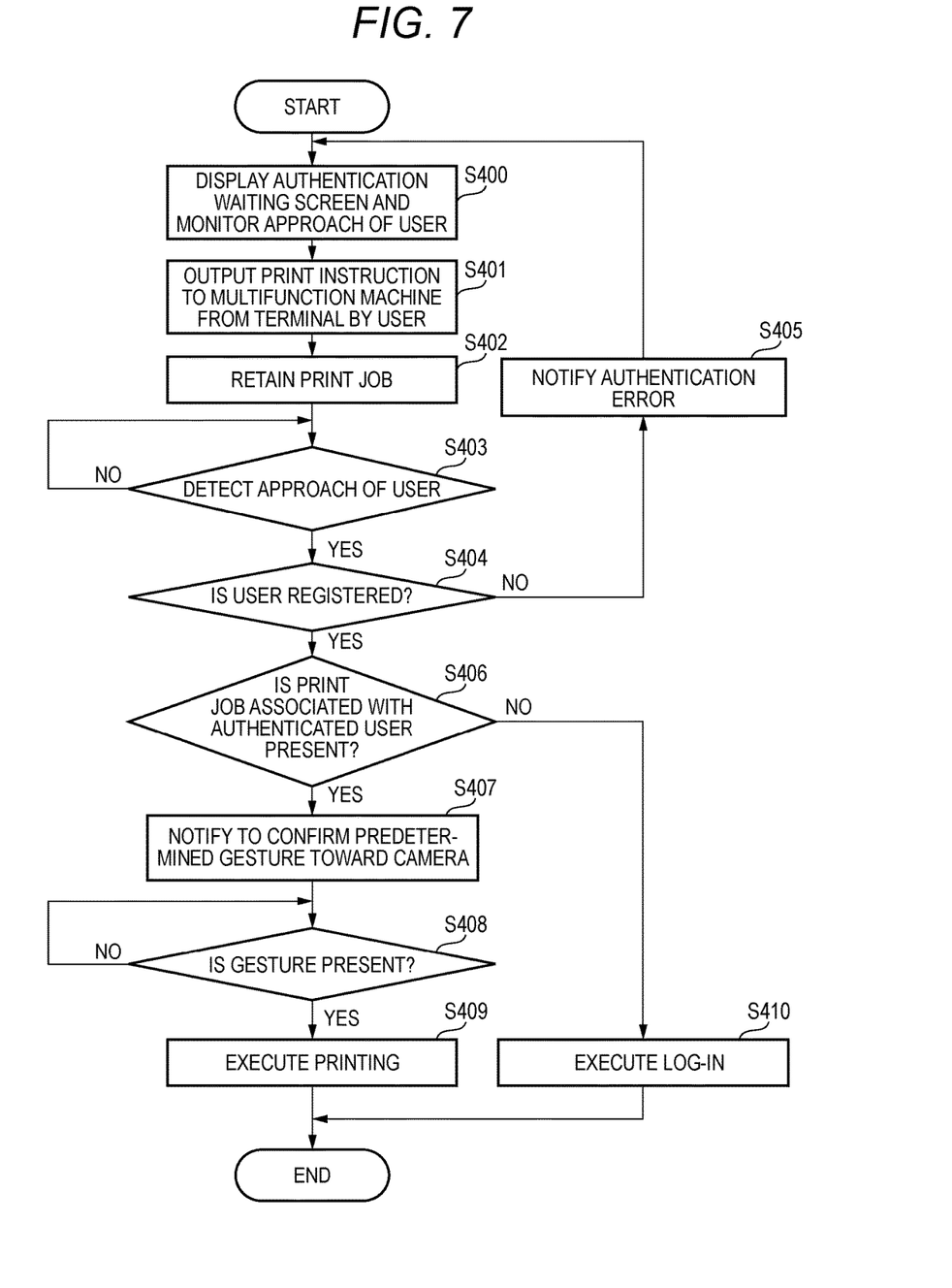
FIG. 7 is a flowchart illustrating another process according to the exemplary embodiment.

FIG. 7 is another modified instance of the process illustrated in FIG. 5 and a flowchart illustrating a process in the case of performing the authentication of the user while detecting the approach of the user using the access camera 29, and confirming the indication of the intention by the recognition camera 30.

First, the main controller 200 displays an authentication waiting screen on the UI touch panel 216, and monitors an approach of a user (S400). Specifically, the main controller 200 monitors the approach of the user with the access camera 29.

Subsequently, the user outputs the print instructions to the multifunction machine from the PC 21 at own seat (S401), and the main controller 200 retains the print job in association with the user (S402).

Subsequently, the main controller 200 determines based on the image of the access camera 29 whether the user approaches (S403), further acquires the user's face image from the image when the user approaches, and collates the acquired face image with the user's face image registered in advance (S404).

When the user whose approach is detected does not match the user registered in advance, authentication is regarded as NG, and thus an authentication error is displayed on the UI touch panel 216 (S405).

When the user whose approach is detected matches the user registered in advance, authentication is regarded as OK, and thus it is determined whether there is a print job associated with the user that is authenticated (S406). When there is no print job associated with the user who is authenticated, a normal log-in is executed (S410).

When there is the print job associated with the user that authenticated, the main controller 200 allows the recognition camera 30 to tilt toward the direction of the user and notifies a message such as "start to print with the predetermined gesture" by a voice. By flickering of LED or the like located near the recognition camera 30 instead of the notification by a voice, it is possible to notify the indication that the recognition camera 30 is on standby for capturing the predetermined gesture to be executed. The predetermined gesture is arbitrary and includes, for instance, a motion of raising one of the user's hands, nodding the user's head, or raising the user's thumb.

When the user executes the predetermined gesture in response to such notification, the gesture is captured and acquired by the recognition camera 30, and the main controller 200 determines that the indication of the intention of the print execution is present and executes the printing (S409). On the other hand, when the user does not execute the predetermined gesture, the main controller 200 determines that the indication of intention of the print execution is not present and does not execute the printing. When the intention of the print execution is not present for a certain period of time, it may be shifted to normal log-in execution (S410)

Figure 8:
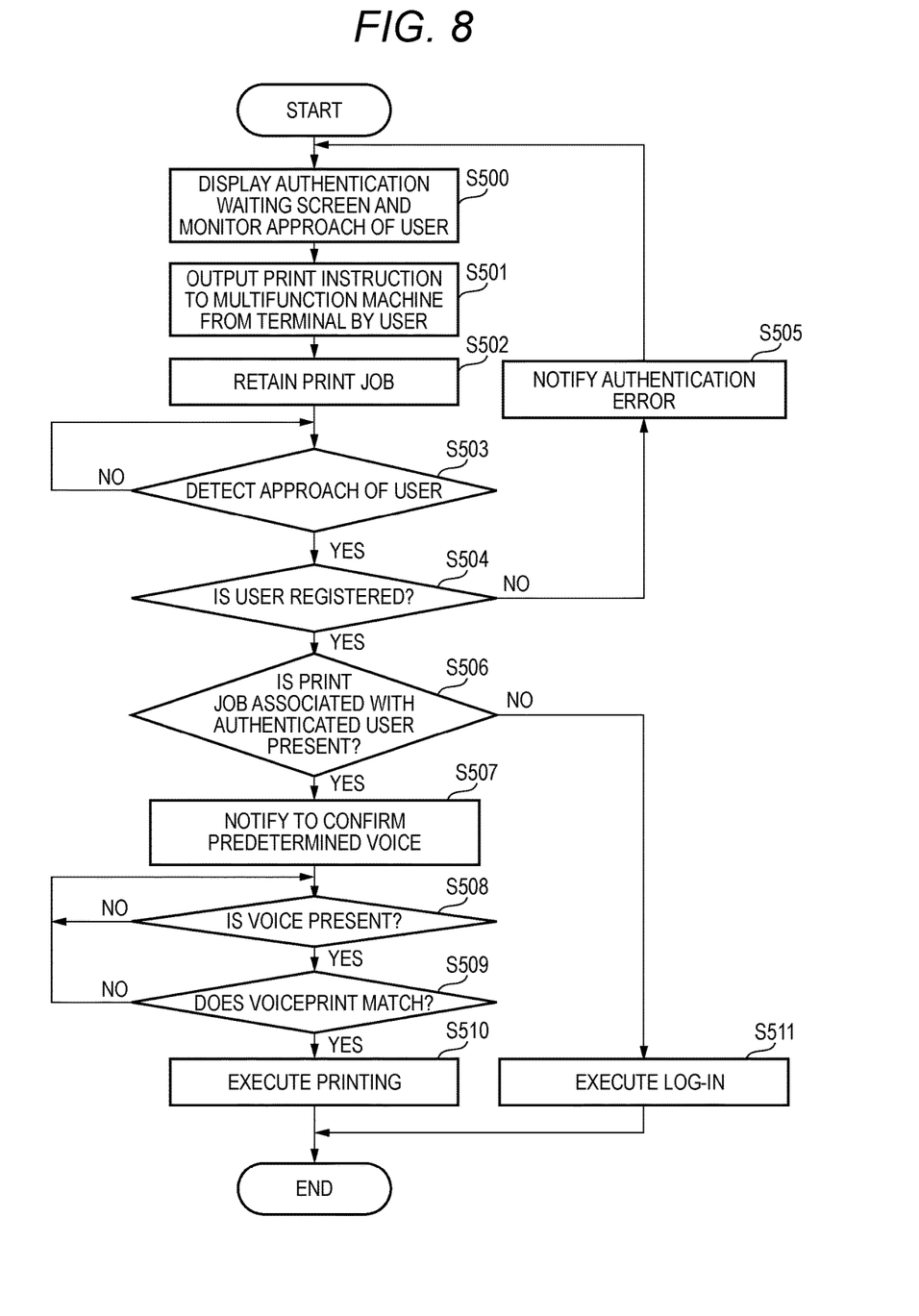
FIG. 8 is a flowchart illustrating another process according to the exemplary embodiment.

FIG. 8 is an instance of another modified process illustrated in FIG. 5 and a flowchart illustrating a process in the case of performing the authentication of the user while detecting the approach of the user using the access camera 29, and performing the notification to confirm the indication of intention by a voice.

First, the main controller 200 displays an authentication waiting screen on the UI touch panel 216, and monitors an approach of a user (S500). Specifically, the main controller 200 monitors the approach of the user with the access camera 29.

Subsequently, the user outputs the print instructions to the multifunction machine from the PC 21 at own seat (S501), and the main controller 200 retains the print job in association with the user (S502).

Subsequently, the main controller 200 determines based on the image from the access camera 29 whether the user approaches (S503), further acquires a user's face image from the image when the user approaches, and collates the acquired face image with the user's face image registered in advance (S504).

When the user whose approach is detected does not match the user registered in advance, authentication is regarded as NG, and thus an authentication error is displayed on the UI touch panel 216 (S505).

When the user whose approach is detected matches the user registered in advance, authentication is regarded as OK, and thus it is determined whether there is a print job associated with the user that is authenticated (S506). When there is no print job associated with the user that is authenticated, a normal log-in is executed (S511).

When there is the print job associated with the user that is authenticated, the main controller 200 notifies a message such as "start to print" by a voice from a speaker.

When the user utters a predetermined voice, for instance, "Hi", "OK", or "Go" in response to such notification, the voice is input from a microphone, and it is determined whether a voiceprint of the voice matches a user that is authenticated (S509). This determination is executed by collation of a user's voiceprint registered in advance with the voiceprint of the voice input as a voiceprint of the authenticated user. When the voiceprint of the input voice matches the voiceprint of the authenticated users, the main controller 200 determines that the indication of the intention of the print execution is present and executes the printing (S510). On the other hand, when the user utters a voice such as "No", "No Good", "Halt", or "Stop" or the voiceprints do not match, the main controller 200 determines that the indication of the intention of the print execution is not present and does not execute the printing. When the intention of the print execution is not present for a certain period of time, it may be shifted to normal log-in execution (S511).

In this exemplary embodiment, the match confirmation of the voiceprint is performed in consideration of the fact that there is also a case where a person other than the user utters the voice. For instance, the match confirmation of the voiceprint is performed not to erroneously stop the print execution in a case where the authenticated user has an indication of the intention of the print execution but a person other than the user utters "stop".

As described above, the exemplary embodiment of the invention has been described, but the invention is not limited thereto and may be variously modified.

For instance, although the retained print job is executed when the indication of the intention of the authenticated user is confirmed in S208 in FIG. 5, which is the flowchart illustrating the process, execution modes of the print job are also confirmed at this time, and thus the print job may be executed according to the execution modes. The execution modes include the number of copies to be printed or contents of the print, document data to be printed, and the like. For instance, as illustrated in FIG. 6, which is the flowchart illustrating the process, when the indication of the intention is confirmed by the notification to the mobile terminal, the number of copies to be printed or contents of the print, and document data to be printed as well as the notification of "print YIN" are designated and thus transmitted to the main controller 200. When the form of "the number of copies to be printed: 2, monochrome print, document data "a"" is designated by the user and is then transmitted to the main controller 200, the main controller 200 outputs a print execution command to the image forming unit 240 according to the designated number of copies to be printed. In FIG. 7, which is the flowchart illustrating the process, the number of copies to be printed and the like can be designated by the gesture. For instance, the number of copies to be printed is designated to be two by a gesture using two fingers. In FIG. 8, which is the flowchart illustrating the process, the number of copies to be printed can be designated by the voice.

In FIG. 4 or 5, which is the flowchart illustrating the process, when the user outputs the print instructions to the multifunction machine from the PC 21, it may output data for designating whether to automatically start the print execution with the completion of authentication as a trigger, in addition to the document data to be printed. The main controller 200 receives the data for designating whether to automatically start the print execution together with the print instructions. For instance, the user outputs the indication to automatically start the print execution by checking a check box of "auto-execution" as a type of indication of intention of image formation. In the case of outputting the data to automatically start the print execution with the completion of authentication as a trigger, the main controller 200 executes the processing flowchart illustrated in FIG. 4. On the other hand, in the case of outputting data indicating the need for a separate indication of intention without automatically starting the print execution with the completion of authentication as a trigger, the main controller 200 executes the processing flowcharts illustrated in FIGS. 5 to 8.

Further, in a case where a plurality of user's print jobs are retained in the multifunction machine, the print jobs that are still be retained in the UI touch panel 216 may be displayed for each user and in a list form according to the reception order of the print instructions when the authentication of any user is completed and the print job associated with the user is executed. The user can visually recognize the list, thereby instructing the change or stop of a print job subsequent to the print job that is automatically executed.

A flow in the case of obtaining authentications from the outside is described based on FIG. 5.

An instance of an external device for performing authentication of the user includes a network camera that monitors the image processing system. The network camera monitors the image processing system, and thus can acquire a user's face image.

In S203 in FIG. 5, the image processing system detects the approach of the user. The detection may be performed by, for example, a combination of the person presence sensor and the access camera, or by an infrared array sensor configured to detect up to the approach of a person. The image processing system requests authentication information from the network camera when detecting the approach of the user by the sensor. The authentication information may be requested from all surrounding network cameras, or may be request from only a preset network camera. In response to the request, the network camera performs user authentication from the user's face image or the like (S204). When the user captured by the network camera is a registered user, user-specifying information such as ID of the registered user is notified to the image processing system as an authentication result. The image processing system executes the step S206 and subsequent steps based on the user information that is received. When the user captured by the network camera is not a registered user, an authentication error is notified to the image processing system (S205). In this case, since the user is required to be authenticated at the periphery of the image processing system, it may switch to the display to require the user authentication on the display unit or the like.

Although the network camera is exemplified, a camera for a mobile terminal such as a smart phone may be used.

In this exemplary embodiment, it may be noted that the following technical matters are included: (i) The authentication unit of the image processing system 10 authenticates the user by the action to which the indication of the intention of the user is reflected. (ii) In a case where the authentication is completed at the authentication unit, the image forming unit of the image processing system 10 executes the image forming instructions when the indication of the intention of image formation from the authenticated user is present. (iii) The image processing system 10 includes a notification unit that notifies the authenticated user an indication of intention of the image formation is required. (iv) The indication of the intention from the authenticated user is any one of the instructions from a mobile terminal of the user, a predetermined gesture by the user, utterance of a predetermined voice by the user, or data transmission of automatic execution permission accompanied by the image forming instructions.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print processing system comprising
a processor configured to act as:
   a retaining unit that retains a print instruction from a user;
   an authentication unit that authenticates the user through:
     vicinity authentication including: (i) passing an IC card over a sensor, (ii) detecting a fingerprint or a vein, or (iii) capturing a face with a camera with the face approaching a predetermined position relative to the camera, or
     remote authentication including image-capturing with a camera at a remote distance; and
   a printing unit that prints based on the print instruction of the authenticated user, wherein:
   in a case where the authentication unit completes the vicinity authentication, the printing unit prints based on the print instruction without accepting an execution instruction of the print instruction by the authenticated user, and
   in a case where the authentication unit completes the remote authentication, the printing unit prints in response to the execution instruction of the print instruction from the authenticated user.

2. The print processing system according to claim 1, wherein the authentication unit starts the authentication of the user in response to a user's action.

3. The print processing system according to claim 1, wherein in a case where the authentication unit completes the authentication, the printing unit prints based on the print instruction in response to the execution instruction from the authenticated user, without accepting the execution instruction by the authenticated user.

4. The print processing system according to claim 3, wherein the processor is further configured to act as a notification unit that notifies the authenticated user that the execution instruction is needed.

5. The print processing system according to claim 3, wherein the execution instruction from the authenticated user is at least one of an instruction from a mobile terminal of the user, a predetermined gesture by the user, a predetermined utterance by the user, or data transmission of automatic execution permission accompanied by the print instruction.

6. The print processing system according to claim 3, wherein the processor is further configured to accept propriety of automatic execution from the user, wherein the printing unit prints based on the print instruction when the authentication unit completes the authentication in a case where the automatic execution is accepted by the processor, and the printing unit prints based on the print instruction when the authentication unit completes the authentication and an indication of intention of printing is present from the authenticated user in a case where the automatic execution is not accepted by the processor.

7. A non-transitory computer readable medium storing a program causing a computer to execute a process comprising:

retaining a print instruction from a user;
authenticating the user through:
vicinity authentication including: (i) passing an IC card over a sensor, (ii) detecting a fingerprint or a vein, or (iii) capturing a face with a camera with the face approaching a predetermined position relative to the camera, or
remote authentication including image-capturing with a camera at a remote distance; and
printing based on the print instruction of the authenticated user wherein:
in a case where the authentication unit completes the vicinity authentication, the printing unit prints based on the print instruction without accepting an execution instruction of the print instruction by the authenticated user, and
in a case where the authentication unit completes the remote authentication, the printing unit prints in response to the execution instruction of the print instruction from the authenticated user.

8. A print processing apparatus comprising a processor configured to act as:

a retaining unit that retains a print instruction from a user;
an authentication unit that authenticates the user through:
vicinity authentication including: (i) passing an IC card over a sensor, (ii) detecting a fingerprint or a vein, or (iii) capturing a face with a camera with the face approaching a predetermined position relative to the camera, or
remote authentication including image-capturing with a camera at a remote distance; and
a printing unit that prints based on the print instruction of the authenticated user, wherein:
in a case where the authentication unit completes the vicinity authentication, the printing unit prints based on the print instruction without accepting an execution instruction of the print instruction by the authenticated user, and
in a case where the authentication unit completes the remote authentication, the printing unit prints in response to the execution instruction of the print instruction from the authenticated user.

9. The print processing apparatus according to claim 8, further comprising:
a UI touch panel configured to accept the execution instruction from the user.

10. The print processing system according to claim 1, further comprising
a sensor that senses an approach of the user, wherein
the authentication unit begins to authenticate the user after the sensor senses the approach of the user.

11. The print processing apparatus according to claim 8, further comprising
a sensor that senses an approach of the user, wherein
the authentication unit begins to authenticate the user after the sensor senses the approach of the user.

12. The print processing system according to claim 1, further comprising:
a UI touch panel configured to accept the execution instruction of the print instruction.

13. The print processing apparatus according to claim 7, further comprising:
accepting, by a UI touch panel, the execution instruction of the print instruction.

\* \* \* \* \*